United States Patent
Salmela et al.

(10) Patent No.: US 8,788,629 B2
(45) Date of Patent: Jul. 22, 2014

(54) HIP NODE REACHABILITY

(75) Inventors: Patrik Salmela, Kirkkonummi (FI); Petri Jokela, Espoo (FI); Raimo Vuopionperë, Helsinki (FI); Jan Melén, Espoo (FI)

(73) Assignee: Optis Wireless Technology, LLC, Plano, TX (US)

( * ) Notice: Subject to any disclaimer, the term of this patent is extended or adjusted under 35 U.S.C. 154(b) by 348 days.

(21) Appl. No.: 12/599,714

(22) PCT Filed: May 8, 2008

(86) PCT No.: PCT/EP2008/055682
§ 371 (c)(1),
(2), (4) Date: Mar. 26, 2010

(87) PCT Pub. No.: WO2008/138853
PCT Pub. Date: Nov. 20, 2008

(65) Prior Publication Data
US 2010/0306350 A1  Dec. 2, 2010

(30) Foreign Application Priority Data
May 11, 2007 (GB) .................................. 0709086.3

(51) Int. Cl.
*G06F 15/177* (2006.01)
(52) U.S. Cl.
USPC ........... 709/220; 709/223; 709/230; 709/238; 709/245
(58) Field of Classification Search
CPC ............ H04W 80/04; H04L 29/12103; H04L 61/1535
USPC .......................... 709/220, 223, 238, 245, 230
See application file for complete search history.

(56) References Cited

U.S. PATENT DOCUMENTS

2002/0184357 A1  12/2002  Traversat et al.
2003/0097456 A1*  5/2003  Huh et al. ................... 709/230

(Continued)

FOREIGN PATENT DOCUMENTS

GB  2420257 A  12/2007

OTHER PUBLICATIONS

Novaczki S. et al., "A HIP Based Network Mobility Protocol ," Applications and the Internet Workshops, Issue Date: Jan. 2007 on p. 48-48, Print ISBN: 0-7695-2757-4; Digital Object Identifier: 10.1109/SAINT-W.2007.8, Date of Current Version: Feb. 12, 2007.*

(Continued)

*Primary Examiner* — Oanh Duong
(74) *Attorney, Agent, or Firm* — Vincent J. Allen; Carstens & Cahoon, LLP

(57) ABSTRACT

A method of configuring a plurality of rendezvous servers to provide a Host Identity Protocol, HIP, based mobility service to HIP nodes, where the servers are arranged in a hierarchical branching structure. For each HIP node, a Host Identity Tag, HIT, and contact address mapping is registered with a rendezvous server. That server then identifies itself and the HIT to each higher level server within the same branch, without explicitly identifying the contact address to those higher level servers wherein, in use, when a first rendezvous server receives a HIP contact message addressed to a given HIT, if that first server is unaware of the destination HIT, it forwards the message to a higher level server within the same branch and if the first server is not the server at which the HIT is registered but is aware of the HIT, it forwards the contact message to the neighbouring rendezvous server corresponding to the HIT.

10 Claims, 4 Drawing Sheets

(56) References Cited

U.S. PATENT DOCUMENTS

| | | | |
|---|---|---|---|
| 2003/0202479 A1* | 10/2003 | Huang et al. | 370/252 |
| 2004/0044727 A1* | 3/2004 | Abdelaziz et al. | 709/203 |
| 2004/0162870 A1* | 8/2004 | Matsuzaki et al. | 709/200 |
| 2005/0144320 A1* | 6/2005 | Jagana et al. | 709/245 |
| 2007/0283002 A1* | 12/2007 | Bornhoevd et al. | 709/224 |
| 2008/0056207 A1* | 3/2008 | Eriksson et al. | 370/338 |
| 2008/0195737 A1* | 8/2008 | Jokela et al. | 709/227 |
| 2008/0271132 A1* | 10/2008 | Jokela et al. | 726/10 |
| 2009/0189736 A1* | 7/2009 | Hayashi | 340/5.81 |
| 2009/0279452 A1* | 11/2009 | Akiyoshi | 370/254 |
| 2010/0284400 A1* | 11/2010 | Mel n et al. | 370/389 |

OTHER PUBLICATIONS

J. Laganier and L eggert: "Host Identity Protocol (HIP) Rendezvous Extension", Internet-Draft, Jun. 2006.*

Novaczki. S. et al: A HIP based network mobility protocol. Jan. 15-19, 2007, IEEE Computer Society. ISBN 0-7695-2757-4.

* cited by examiner

HIP NODE REACHABILITY

TECHNICAL FIELD

The present invention relates to reachability of a mobile HIP node in an IP network when Rendezvous Servers are used.

BACKGROUND

In the Host Identity Protocol (HIP) [1] Working Group at the IETF there is a draft on Rendezvous Server (RVS) functionality [2]. An RVS is used as a fixed anchor point from which a mobile HIP node can be reached. A HIP node registered at an RVS informs the RVS of the locators via which the HIP node is reachable. This way HIP nodes that want to contact the mobile HIP node can always reach it via the RVS that has up-to-date locator information of the mobile HIP node.

To be able to utilize the RVS for locating another HIP node, the HIP node initiating the connection needs to know the locator of the RVS. The current proposal is that the IP address of the RVS is found in DNS along with the Identity of the mobile HIP node. However, this requires that information is updated at the DNS for each HIP node that wants to be registered at an RVS. This might not be feasible in all situations, e.g. in military networks or other more or less private networks that at least partly share the public network infrastructure. In these networks it might also be that DNS is not available at all or is only available sporadically.

Robustness of the RVS system is also a problem in the current solution. For example, if an RVS is suddenly removed from the network, it is not possible to contact a destination host registered at the RVS even if there is a path to that host.

The article entitled "A HIP Based Network Mobility Protocol", Szabolcs Nováczki, Proc. of the 2007 International Symposium on Applications and the Internet Workshops (SAINTW'07), 15-19 Jan. 2007, describes a HIP extension for supporting moving networks. The proposal makes use of a hierarchical local rendezvous server (LRVS) structure to route traffic between the Internet and mobile nodes. For a given mobile node, following registration with the local network, traffic will always pass between the LRVS server to which the node is registered and the root LRVS that connects to the Internet. Within the Internet the RVS structure described above is implemented. As discussed, this RVS structure can make use of the DNS to allow HIP nodes to determine contact information for peer nodes (using a HIT lookup). The LRVS structure does not itself allow mobile nodes registered with the local network to identify contact addresses for peer nodes.

SUMMARY

The disadvantages noted above may be overcome by implementing an RVS server hierarchy, and passing HIP registration information up through the hierarchy from the registration server to a top lever server. In this way contact requests can be referred up the hierarchy if necessary until a knowledgeable server is identified. Moreover, only the registration server, and possible certain servers within a cluster at the same level, needs to be aware of the actual contact address for a HIP node, reducing signalling at node mobility.

According to a first aspect of the invention there is provided a method of configuring a plurality of rendezvous servers to provide a Host Identity Protocol, HIP, based mobility service to HIP nodes, where the servers are arranged in a hierarchical branching structure. For each HIP node, a Host Identity Tag, HIT, and contact address mapping is registered with a rendezvous server. That server then identifies itself and the HIT to each higher level server within the same branch, without explicitly identifying the contact address to those higher level servers wherein, in use, when a first rendezvous server receives a HIP contact message addressed to a given HIT, if that first server is unaware of the destination HIT, it forwards the message to a higher level server within the same branch, and if the first server is not the server at which the HIT is registered but is aware of the HIT, it forwards the contact message to the neighbouring rendezvous server corresponding to the HIT.

Embodiments of the invention may avoid the need for a DNS to identify to an originating HIP node an RVS that knows the location of a destination HIP node. Rather, a contact message is routed up through the RVS hierarchy until it reaches an RVS that either knows the contact address for the destination node or knows the identity of another RVS in the branch towards such an RVS.

Following registration of a HIP node at a registration rendezvous server, a notification may be sent from that registering server to one or more other servers within the same hierarchical layer to identify to the other server(s) the HIT to contact address mapping for the HIP node. This creates a cluster of servers which are all aware of the contact address of a HIP node and which can therefore all forward a HIP contact message to the HIP node. For reasons of signalling efficiency, said notification may be sent to servers within the same geographic region as the registration server.

In order to authenticate a server claiming to have registered a HIP node, upon registration of a HIP node the registration rendezvous server may send notifications to other servers accompanied with a certificate verifying that the registration server is an approved server. Alternatively, authentication may be based upon a pre-established trust relationship between servers.

In a particular scenario, both the destination HIP node and the originating HIP node of said HIP contact message are registered with one of said rendezvous servers.

According to a second aspect of the present invention there is provided a method of operating a HIP based network comprising a plurality of rendezvous servers configured according to the above aspect of the invention, the method comprising receiving an I1 HIP contact message at a rendezvous server and, if the rendezvous server is unaware of the destination HIT, forwarding the I1 message to a rendezvous server higher in the hierarchical server structure.

According to a third aspect of the present invention there is provided method of operating a rendezvous server for use in providing a Host Identity Protocol, HIP, based mobility service to HIP nodes. The method comprises receiving a HIP contact message destined for a HIP node and, if the server is aware of the destination HIT, forwarding the contact message to a contact address associated with the HIT or to another rendezvous server associated with the HIT and positioned lower in a hierarchical rendezvous server structure. On the other hand, if the server is unaware of the destination HIT, the contact message is forwarded to another rendezvous server positioned higher in the hierarchical rendezvous server structure.

According to a fourth aspect of the present invention there is provided rendezvous server for use in a Host Identity Protocol, HIP, based network, the rendezvous server being arranged to register Host Identity Tag, HIT, to contact address mappings for HIP nodes. Upon registration, the registering server informs one or more other rendezvous servers positioned higher in the hierarchical rendezvous server structure that it knows the contact address for the HIP node without explicitly identifying the contact address.

Features may be implemented in the rendezvous server in order to implement features of the methods set out above.

DETAILED DESCRIPTION

Figure 1:
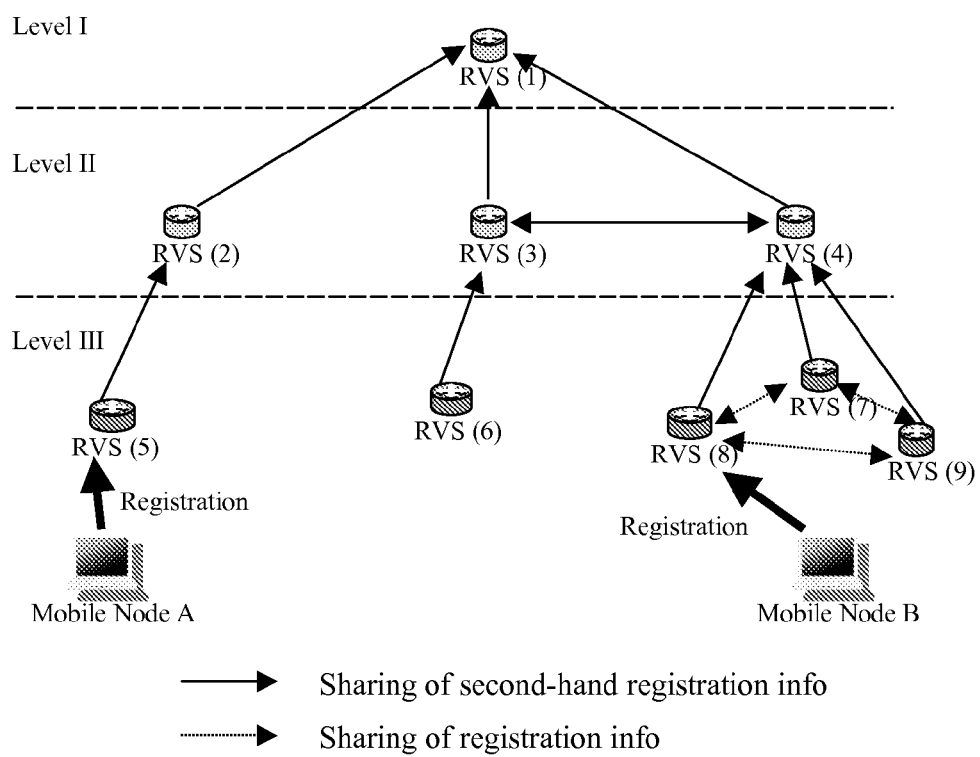
FIG. 1 illustrates schematically an example of a RVS hierarchy with three levels.

Abbreviations used in the following discussion include:
DNS—Domain Name System
HIP—Host Identity Protocol
IETF—Internet Engineering Task Force
RVS—Rendezvous Server
WG—Working Group There is proposed here a hierarchical and robust RVS architecture. The registration information is shared between RVSs that, from a network perspective, are close to each other. All of these RVSs can be used for locating the mobile HIP node, not only the one at which the HIP node is registered. Furthermore, information identifying the RVS knowing the location of a mobile HIP node is shared with RVS(s) at a higher level in the RVS hierarchy. These higher level RVSs do not know the actual current location of the HIP node, i.e. its contact (IP) address, but are able to identify RVSs having that information. If an RVS does not know the target host for an I1 packet (Initiator 1 packet), the I1 packet is sent up the RVS hierarchy until an RVS is found that knows how to reach the target. This reduces the signalling needed for keeping the RVSs' states up-to-date. An example RVS hierarchy with three levels is illustrated in FIG. 1.

When a Mobile Node attaches to a new network it will start the service discovery procedure to find the nearest RVSs. Once these are identified, it will select one of these and run the HIP base exchange as described above, containing the registration extensions (parameters needed for the registration procedure). In addition the Mobile Node includes a sequence number ("birthday counter") or timestamp into the registration request which is used if the RVS already has an entry for the particular Mobile Node. The counter will identify which of the registrations is the most recent, effectively invalidating other information within the network.

For more flexible RVS configuration the Mobile Node includes a certificate with the registration request giving the RVS rights to delegate the registration information further in the network. The usage of this certificate will be described below in more detail.

Groups of RVSs at Level III share up-to-date location information. The RVSs at Level III thus always have up-to-date location information about the subset of hosts that are registered to any of the RVSs that share registration information between themselves. In FIG. 1, RVS 7, 8 and 9 belong to the same group and all have up to date information on Mobile Node B including the HIT to contact address mapping.

An RVS with which a HIP node registers, communicates to the next higher level RVS within the same branch the fact that it knows the location of the HIP node, i.e. it communicates the mapping between its RVS identity and the HIT of the HIP node. It does not communicate explicit location information for the node however. Thus, whilst the higher level RVS does not know the location of the mobile node, it knows that the lower layer RVS knows this information. In the example of FIG. 1 this means that RVS 2 learns that RVS 5 knows how to reach Mobile Node A. Similarly, that higher layer RVS communicates to the next higher layer RVS the fact that it knows how to reach the HIP node, and so on until the chain to the topmost RVS (in this case RVS 1) is complete.

It will be appreciated that contact address changes for a HIP node need only be relayed to the RVS with which the HIP node is registered, and to other RVSs at the same layer and within the same information sharing group. There is no need to pass this information to higher layer RVS. Cross level updates are only necessary when a new HIP node is registered at Level III or when a HIP node removes its registration at an RVS (both events occur of course when a HIP node changes its registration RVS).

In the example of FIG. 1, only the RVSs on Level III have HIP nodes registered with them. Of course, all RVSs may accept registrations regardless of their level in the hierarchy. Moreover, a given RVS in the illustrated architecture could actually be implemented as a cluster of RVSs, resulting in a more robust architecture.

Considering further the example architecture of FIG. 1, Mobile Node A registers at RVS 5. RVS 5 then propagates the registration information to RVS 2, whereby RVS 2 knows that Mobile Node A can be reached via RVS 5, but does not need to know each time that Mobile Node A gets a new locator, since it will anyway still be reachable via RVS 5. Furthermore, RVS 2 propagates the registration information to RVS 1, which in turn learns that RVS 2 knows how to reach Mobile Node A. Alternatively; RVS 1 could also learn that RVS 5 knows how to reach Mobile Node A. In either case, RVSs 3, 4 and 6 to 9 are unaware of Mobile Node A, i.e. they do not know a contact address for Mobile Node A and nor do they explicitly know an RVS that knows how to reach Mobile Node A.

When Mobile Node B registers at RVS 8, the registration information will be "spread" by RVS 8 to RVS 7 and RVS 9. All three RVSs (7, 8, and 9) will also inform the next RVS in the hierarchy, here RVS 4, that they know how to reach Mobile Node B. RVS 4 further informs both RVS 3 (secondary information) and RVS 1 that it can get packets delivered to Mobile Node B.

When Mobile Node B wants to contact Mobile Node A, it sends the I1 packet to its RVS (the RVS it is registered at), here RVS 8. Since RVS 8 is unaware of Mobile Node A, it forwards the I1 packet to RVS 4. At this point, if Mobile Node A would have been registered at RVS 6, the I1 packet would have been forwarded to RVS 3 and from there to RVS 6 and finally Mobile Node A. However, as this is not the case and RVS 4 is again unaware of Mobile Node A, it forwards the I1 packet still higher in the branch to RVS 1. RVS 1 has received second-hand registration information and knows that RVS 2 can help with delivering the packet. RVS 1 therefore forwards the I1 packet to RVS 2. When RVS 2 receives the packet it sends it to RVS 5 which does know where Mobile Node A is located and can forwards the packet to it. After this first HIP base exchange packet (I1), the remaining messages of the HIP base exchange are routed directly between Mobile Nodes A and B. The RVS hierarchy is thus used only as a mechanism for routing the first HIP contact message.

Considering further the sharing of information between RVS, either at the same level or between levels, there are two approaches to ensure security:

a) a trust relationship between the RVSs, with each RVS knowing the identity and locator of other RVSs that it will need to communicate with, and trusting these RVSs.
b) RVSs are given a certificate signed by the root RVS (RVS 1 in FIG. 1), which can be provided to a peer RVS in order to allow that peer RVS to verify that the other RVS has been accepted by the root RVS.

In alternative a), each RVS accepts information it receives from any of the preconfigured RVSs. Alternative b) allows for a more flexible network; a new RVS can be added without having to reconfigure all RVSs that might need to communicate with the new RVS. In case b), when registration information is received at an RVS from a previously unknown RVS, the registration information will contain a certificate that proves that the sending RVS has been approved by the root RVS (RVS 1). Here the root RVS is acting as a Certificate Authority (CA). When the two RVSs have established a HIP association and verified the other RVS's certificate (using the public key of the root RVS), they can exchange registration information. Once two RVSs have verified each others certificates they can in the future directly accept registration information from each other (as long as the certificate is valid). All communication between the RVSs is done over the HIP association, which gives secure communication and peer authentication.

In the case that an RVS does not have a certificate signed by the root RVS, the RVS could still be accepted by the network. When a Mobile Node registers at a first RVS unknown to the network, the Mobile Node may provide the first RVS with a certificate accepting the first RVS as its RVS. The first RVS can provide that certificate to another RVS with which it wants to share registration information. The RVS receiving the certificate can verify that the Mobile Node has signed the certificate for the unknown RVS and that the Mobile Node's own certificate has been signed by the root RVS (or other trusted CA like entity), and can thereby accept the unknown RVS into the RVS hierarchy. Even if the unknown RVS turns out to be malicious, the only harm it can do is to perform a DoS (Denial of Service) attack on the Mobile Node(s) that provided the certificate (i.e. by not forwarding I1 packets to and from the Mobile Node).

In the case that an RVS is suddenly removed, it remains necessary to be able to locate the HIP nodes registered at the removed RVS. RVSs within the same group or cluster need to be alerted to the removal. This could be achieved for example by exchanging "keep alive messages" between RVSs within the same group (and optionally between Mobile Nodes and RVSs). When an RVS, e.g. RVS 8 in FIG. 1, is removed, RVSs 7 and 9 notice this by the lack of response to their keep alive messages. At this point there are two possibilities:
a) The RVSs assume that the mobile node(s) registered at RVS 8 will notice that RVS 8 is no longer present and that they will therefore perform HIP service discovery [3] to find a new suitable RVS with which to register. RVSs 7 and 9 will preserve the registration information received from RVS 8 until a registration timer expires or until they receive new registration information from the mobile node(s).
b) The remaining RVSs in the group can try to establish a new registration context with the mobile node(s) previously registered at RVS 8, thus maintaining reachability to them. This requires that the registration initiated from an RVS contains information identifying the registration it is attempting to replace. Using this information a mobile node can verify that its old RVS is no longer reachable, and register at one of the remaining RVSs in the group. When the RVS initiated registration is completed, the new registration entry is distributed to other RVSs.

A combination of these two possibilities can be considered. Firstly, option b) is utilized, and if the RVSs do not manage to create new registration contexts with the mobile node(s) they utilize option a) and rely on the mobile node(s) performing service discovery once their previous registration expires and they determine that the old RVS is no longer available.

Another registration related issue arises when a mobile node moves far away from the RVS at which it is registered. This is undesirable as most HIP connections are likely to be established between geographically close mobile nodes, and it might be that the connections between level III and level II involve more expensive links, e.g. satellite links. Minimizing the use of the expensive link can be done by changing the used RVS. In any case, it is always desirable to optimise the forwarding paths for contact messages through the RVS hierarchy.

To this end, when a mobile node changes its access network, it could automatically perform HIP service discovery to locate RVSs in the new network. If it finds an RVS that already contains registration information for its HIT (in this case the discovered RVS may abort the registration attempt), the mobile node knows that it is still located close enough to its current RVS and can continue using it. In the case that the found RVS does not have registration information for the HIP node, e.g. in FIG. 1 if Mobile Node B finds RVS 6, it means that the Mobile Node B should change its RVS. Then the Mobile Node B sends a delete registration message to the RVS at which it currently is registered (RVS 8 in this example), and at the same time performs registration at the new found RVS (RVS 6). When the old RVS (RVS 8) receives the delete registration message it removes the registration information of the mobile node (Mobile Node B) and propagates the delete information in the same manner as if it were an add registration operation.

When a mobile node moves behind a new RVS that does not have a connection to the main network, then the old registration can not be deleted. If and when the new RVS becomes attached to the main network there will be dual RVS entries for the mobile node in the network; the old entry which could not be deleted, and the new entry. To handle this situation all registrations should have a sequence number or timestamp which can be used for deciding upon which entry is the current one.

Figure 2:
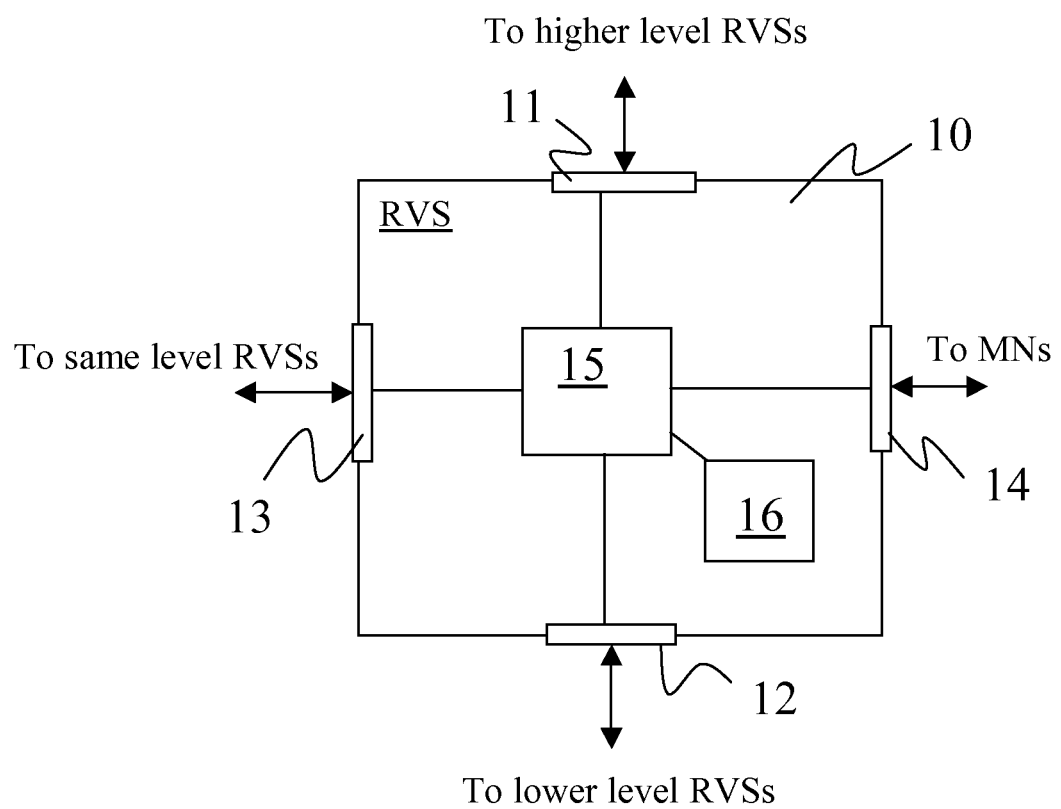
FIG. 2 illustrates schematically a rendezvous server suitable for use in the hierarchical structure of FIG. 1.

FIG. 2 illustrates schematically a rendezvous server 10 for use in the hierarchical structure described above. The RVS comprises a first interface 11 for communicating with a higher level RVS within the same branch, and a second interface 12 for communicating with a lower level RVS in the same branch. A third interface 13 is used to communicate with RVSs within the same level, whilst a fourth interface 14 allows the RVS to communicate with mobile nodes. The RVS 10 comprises a main processor 15 which examines incoming I1 messages (received over one of the interfaces) to determine if it is aware of the destination HIT contained within the message and handles them accordingly. The RVS comprises a lookup memory 16 which contains registered HIP mappings, either HITs to HIP node contact addresses, or HITs to next hop RVS identities.

Figure 3:
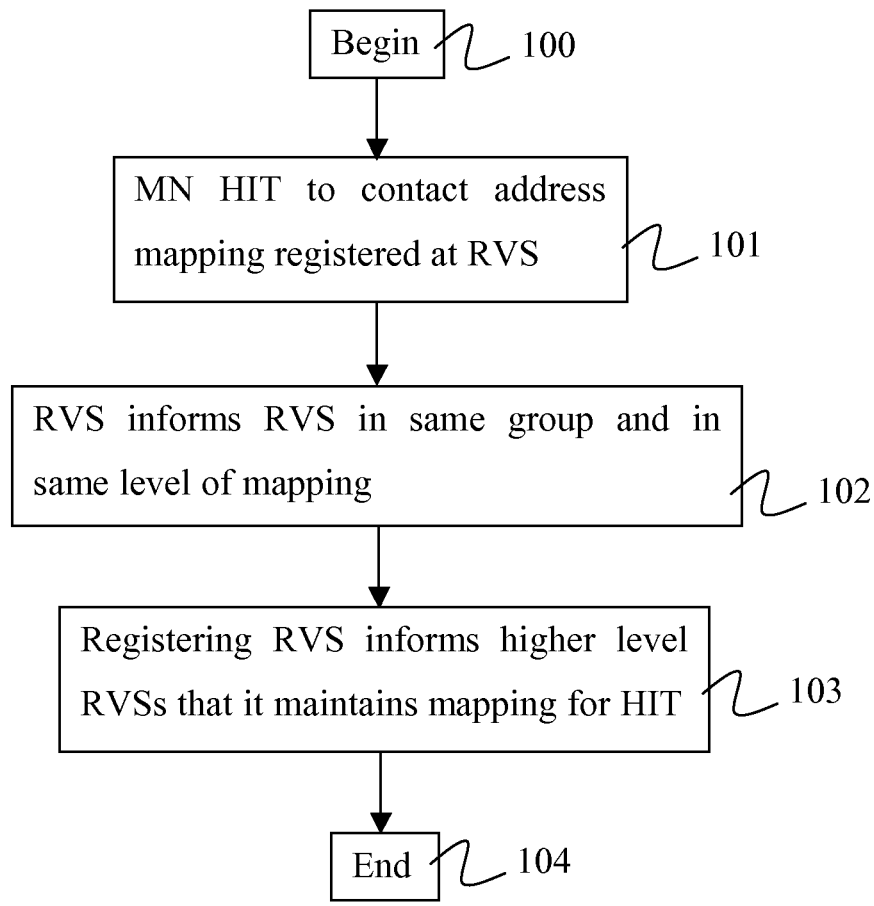
FIG. 3 is a flow diagram illustrating a process for configuring the structure of FIG. 1.

Considering now FIG. 3, this illustrates the process for configuring the RVS structure, from the point of view of a level III RVS. The process begins at step 100, with the RVS performing a registration for a HIP node at step 101. In particular, the RVS registers the HIT to contact address mapping for the HIP node. At step 102 the RVS sends the mapping to other RVSs within the same level and which are within the same RVS cluster. At step 103 the registering RVS informs the next level RVS within the same branch that it knows the mapping for the HIT, but does not provide the contact address. The process ends at step 104.

Figure 4:
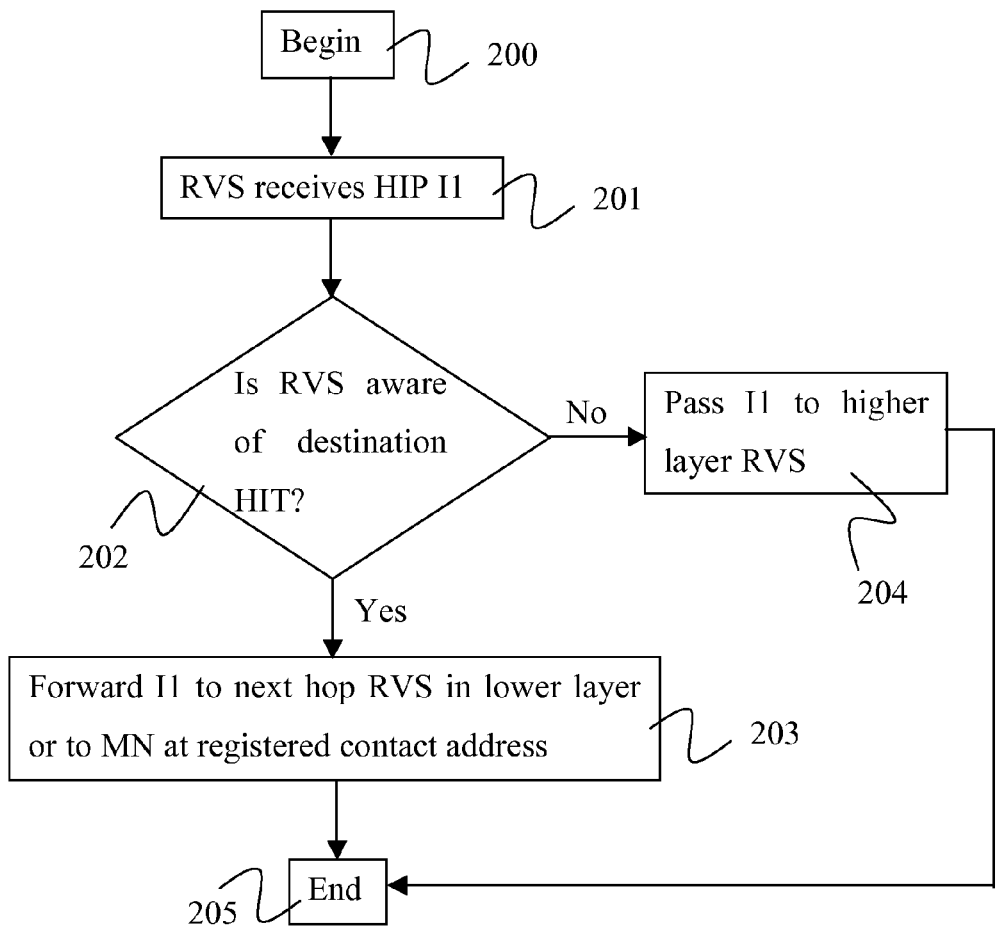
FIG. 4 is a flow diagram illustrating a process for message handling at the rendezvous server of FIG. 2.

FIG. 4 is a flow diagram illustrating the I1 message handling process carried out at an RVS. The process begins at step 200, with the RVS receiving the I1 message at step 201. At step 202 the RVS determines whether or not it is aware of the destination HIT. If the answer is yes, at step 203 the RVS forwards the I1 to the registered contact address if this RVS is the registering RVS, or forwards it to the next hop RVS, i.e. down to the next level RVS within the chain towards the registering RVS. If the RVS is unaware of the destination HIT, at step 204 the RVS passes the I1 to a higher level RVS which will either be aware of the destination HIT or will continue to pass the I1 up to the next level. The process ends at step 205.

Advantages of the architecture described here include the possibility to use any RVS for reaching a mobile HIP node, instead of having to use the one at which the mobile node is registered. The architecture also makes the RVS system more robust by sharing the registration information and eliminating the single point of failure issue. The concept of changing the serving RVS by outdating the information at the old RVS is introduced.

It will be appreciated by the person of skill in the art that various modifications may be made to the above described embodiments without departing from the scope of the present invention.

REFERENCES

[1]—R. Moskowitz, P. Nikander, P. Jokela, and T. Henderson, "Host Identity Protocol", Internet-Draft, work in progress, October 2005.

[2]—J. Laganier and L. Eggert, "Host Identity Protocol (HIP) Rendezvous Extension", Internet Draft draft-ietf-hip-rvs-05, work in progress, July 2006

[3]—P. Jokela, et al, "HIP Service Discovery", Internet draft draft-jokela-hip-service-discovery-00, work in progress, June 2006.

The invention claimed is:

1. A method of operating a plurality of rendezvous servers to provide a Host Identity Protocol, HIP, based mobility service to HIP nodes, the method comprising:

arranging the rendezvous servers in a hierarchical branching structure;

for each of the HIP nodes, registering a Host Identity Tag, HIT, and contact address mapping with a rendezvous server, and identifying to each higher level rendezvous server within the same branch of the hierarchical structure the HIT and a neighbouring or other lower level rendezvous server within the branch, without explicitly identifying the contact address to the higher level rendezvous servers, wherein in use, when a first rendezvous server receives a HIP I1 message addressed to a destination HIT, if the first rendezvous server is unaware of the destination HIT of the HIP I1 message, the first rendezvous server forwards the HIP I1 message to a higher level rendezvous server within the same branch, and if the first rendezvous server is not the rendezvous server at which the destination HIT is registered but is aware of the destination HIT, the first rendezvous server forwards the HIP I1 message to a neighbouring or other lower level rendezvous server corresponding to the destination HIT.

2. The method according to claim 1 and comprising, following registration of a HIP node at a registration rendezvous server, sending a notification from that registering rendezvous server to one or more other rendezvous servers within the same hierarchical layer to identify to the other rendezvous server(s) the HIT to contact address mapping for the HIP node.

3. The method according to claim 2 and comprising sending said notification to rendezvous servers within the same geographic region as the registration rendezvous server.

4. The method according to claim 1, wherein upon registration of a HIP node the registration rendezvous server sends notifications to other rendezvous servers accompanied with a certificate verifying that the registration rendezvous server is an approved rendezvous server.

5. The method according to claim 1, wherein upon registration of a HIP node the registration rendezvous server sends notifications to other rendezvous servers with which the registration rendezvous server has an established trust relationship.

6. The method according claim 1, wherein said contact address is an IP address.

7. The method according to claim 1, wherein both the destination HIP node and the originating HIP node of said HIP I1 message are registered with one of said rendezvous servers.

8. The method according to claim 1, wherein said step of identifying to each higher level rendezvous server within the same branch the HIT and a neighbouring or other lower level rendezvous server within the branch, comprises informing each rendezvous server above the rendezvous server at which the HIP node is registered of the HIT and the identity of the registering rendezvous server.

9. The method according to claim 1, wherein said step of identifying to each higher level rendezvous server within the same branch the HIT and the neighbouring or other lower level rendezvous server within the branch, comprises identifying to each higher level rendezvous server in the same branch the HIT and an identity of the neighbouring rendezvous server and lower level rendezvous server.

10. A method according to claim 1, further comprising receiving the I1 HIP message at the first rendezvous server, determining whether or not a contact address mapping for the destination HIT of the I1 message is registered at the first rendezvous server and, if a mapping is not registered, forwarding the I1 message to a rendezvous server higher in the hierarchical rendezvous server structure.

* * * * *